(12) United States Patent
Shin et al.

(10) Patent No.: US 10,303,931 B2
(45) Date of Patent: May 28, 2019

(54) LIGHT IRRADIATION METHOD AND LIGHT IRRADIATION APPARATUS

(71) Applicant: SUPREMA INC., Gyeonggi-do (KR)

(72) Inventors: Hochul Shin, Gyeonggi-do (KR); Kideok Lee, Gyeonggi-do (KR); Dae Jin Kwon, Gyeonggi-do (KR); Hyun Suk Lee, Gyeonggi-do (KR); Bong Seop Song, Gyeonggi-do (KR); Jae Won Lee, Gyeonggi-do (KR)

(73) Assignee: SUPREMA INC., Gyeonggi-Do (KR)

( * ) Notice: Subject to any disclaimer, the term of this patent is extended or adjusted under 35 U.S.C. 154(b) by 13 days.

(21) Appl. No.: 15/633,082

(22) Filed: Jun. 26, 2017

(65) Prior Publication Data

US 2018/0173941 A1  Jun. 21, 2018

(30) Foreign Application Priority Data

Dec. 21, 2016 (KR) .......... 10-2016-0176027

(51) Int. Cl.
| | |
|---|---|
| G06K 9/00 | (2006.01) |
| G06K 9/46 | (2006.01) |
| G07C 9/00 | (2006.01) |
| G06K 9/20 | (2006.01) |

(52) U.S. Cl.
CPC ..... *G06K 9/00288* (2013.01); *G06K 9/00248* (2013.01); *G06K 9/00255* (2013.01); *G06K 9/2027* (2013.01); *G06K 9/4661* (2013.01); *G07C 9/00158* (2013.01)

(58) Field of Classification Search
None
See application file for complete search history.

(56) References Cited

U.S. PATENT DOCUMENTS

| | | | |
|---|---|---|---|
| 9,986,151 B1* | 5/2018 | Poon | H04N 5/23219 |
| 2003/0185423 A1* | 10/2003 | Dobashi | G06K 9/00221 |
| | | | 382/118 |
| 2006/0055834 A1* | 3/2006 | Tanitsu | G03B 27/42 |
| | | | 349/5 |
| 2009/0202236 A1* | 8/2009 | Hama | G03B 7/16 |
| | | | 396/180 |

(Continued)

FOREIGN PATENT DOCUMENTS

| | | |
|---|---|---|
| JP | 2009-182445 | 8/2009 |
| KR | 10-2016-0089755 | 7/2016 |

*Primary Examiner* — Hadi Akhavannik
(74) *Attorney, Agent, or Firm* — Brinks Gilson & Lione

(57) ABSTRACT

An apparatus is for irradiating light for obtaining a face image of an authentication target. The apparatus includes a first light source unit having a first glancing angle, a second light source unit having a second glancing angle greater than the first glancing angle, and an external light information acquisition unit configured to acquire environment information on an external light other than the first light source unit and the second light source unit for the authentication target. The apparatus further includes a control unit configured to determine a power ratio of a second driving power supplied to the second light source unit to a first driving power supplied to the first light source unit based on the environment information and control currents to be supplied to the first light source unit and the second light source unit based on the power ratio.

18 Claims, 9 Drawing Sheets

(56) References Cited

U.S. PATENT DOCUMENTS

| | | | | |
|---|---|---|---|---|
| 2009/0278658 A1* | 11/2009 | Higashiyama | ..... | G06K 9/00604 340/5.82 |
| 2010/0246904 A1* | 9/2010 | Yamashita | ......... | G06K 9/00255 382/118 |
| 2011/0227962 A1* | 9/2011 | Shimizu | ............... | G09G 3/3426 345/690 |
| 2014/0160754 A1* | 6/2014 | Lee | ..................... | H01L 25/0753 362/237 |

* cited by examiner

LIGHT IRRADIATION METHOD AND LIGHT IRRADIATION APPARATUS

CROSS-REFERENCE TO RELATED APPLICATIONS

This application claims priority to Korean Patent Application No. 10-2016-0176027 filed on Dec. 21, 2016, the entire contents of which are incorporated herein by reference.

TECHNICAL FIELD

The disclosure relates to a light irradiation method and a light irradiation apparatus; and more particularly, to a method and an apparats for irradiating light for obtaining a face image of a biometric authentication target.

BACKGROUND

It is known that there are various biometric authentication techniques such as a face authentication technique, a fingerprint authentication technique, an iris authentication technique, a blood vessel authentication technique and the like.

In the face authentication technique, light is irradiated from a light source to obtain a face image, and a face image of an authentication target is obtained within a light irradiation region by a camera. Then, a face authentication process is performed on the obtained face image.

In this face authentication technique, a surrounding environment such as an environment illuminance or the like is an important factor to be considered in obtaining a face image used for face authentication.

In a conventional face authentication apparatus, an environment light illuminance is measured by an illuminance sensor, and light is irradiated by a light irradiation apparatus in a state where an illuminance is determined to be low when the environment light illuminance is low and to be high when the environment light illuminance is high.

However, power consumption is limited in an actual driving environment of the light source that irradiates light to obtain the face image. Therefore, even when the surrounding environment light illuminance is high, the increase in the illumination illuminance is limited, which results in a problem that a face image for face authentication may not be obtained.

Patent Document 1: Korean Patent Application Publication No. 10-2009-0012330.

SUMMARY

In view of the above, the disclosure provides a light irradiation apparatus and a light irradiation method which can constantly provide optimal face authentication performance regardless of changes in a surrounding environment in spite of limited power consumption by adaptively controlling a current supplied to a light source for irradiating light for obtaining a face image of a authentication target in response to changes in the surrounding environment.

The drawbacks of the present disclosure are not limited to the aforementioned drawbacks, and other drawbacks that have not been mentioned can be clearly understood by those skilled in the art from the following description.

In accordance with a first aspect of the present disclosure, there is provided an apparatus for irradiating light for obtaining a face image of an authentication target, the apparatus including: a first light source unit having a first glancing angle; a second light source unit having a second glancing angle greater than the first glancing angle; an external light information acquisition unit configured to acquire environment information on an external light other than the first light source unit and the second light source unit for the authentication target; and a control unit configured to determine a power ratio of a second driving power supplied to the second light source unit to a first driving power supplied to the first light source unit based on the environment information and control currents to be supplied to the first light source unit and the second light source unit based on the power ratio.

The environment information may include an illuminance of the external light, and the control unit may reduce the power ratio as the illuminance of the external light is increased.

The control unit may control a sum of the first driving power and the second driving power to be smaller than or equal to a preset maximum tolerable value.

The light irradiation apparatus may obtain the illuminance of the external light by using an average illuminance calculated from pixels of the face image obtained from the authentication target.

The control unit may control the first light source unit and the second light source unit such that light uniformity in a two-dimensional optimal face authentication region that is greater than or equal to a predetermined size and separated from the light irradiation apparatus by a predetermined distance becomes greater or equal to a uniformity threshold that allows face authentication, and the control unit may control a size of the optimal face authentication region which is obtained when an illuminance of the external light is greater than or equal to the predetermined threshold to be smaller than a size of the optimal face authentication region which is obtained when the illuminance of the external light is smaller than the predetermined threshold.

The external light information acquisition unit may include an optical sensor configured to measure an illuminance of the external light, and the environment information may be measured by the optimal sensor.

The environment information may include light uniformity of the external light, and the control unit may control the first light source unit and the second light source unit not to operate when light uniformity of the external light is greater than a first uniformity threshold, controls the power ratio to a preset value when the light uniformity of the external light is greater than or equal to a second uniformity threshold and smaller than the first uniformity threshold, the second uniformity threshold being smaller than the first uniformity threshold, and controls the power ratio to be reduced when the light uniformity of the external light is smaller than the second uniformity threshold.

The light irradiation apparatus may use the light uniformity of the external light which is calculated from pixels of a face image obtained from the authentication target before the irradiation of the light by the first light source unit and the second light source unit.

The first light source unit may include N-number of first light emitting elements having the first glancing angle, N being a natural number greater than or equal to 1; the second light source unit includes M-number of second light emitting elements having the second glancing angle, M being a natural number greater than or equal to 1; and the first light emitting elements are arranged at a central region in a horizontal direction or in a vertical direction of a light emitting surface and the second light emitting elements are arranged at an outer region of the central region.

The first light source unit may include N-number of first light emitting elements having the first glancing angle, N being a natural number greater than or equal to 1; the second light source unit may include M-number of second light emitting elements having the second glancing angle, M being a natural number greater than or equal to 1; and the first light emitting elements and the second light emitting elements may be arranged alternately on a light emitting surface.

The first light source unit may include N-number of first light emitting elements having the first glancing angle, N being a natural number greater than or equal to 1; the second light source unit may include M-number (of second light emitting elements having the second glancing angle, M being a natural number greater than or equal to 1; and an average separated distance from an image pickup device configured to pick up the face image of the authentication target to the first light emitting elements may be greater than an average separated distance from the image pickup device to the second light emitting elements.

In accordance with a second aspect of the present disclosure, there is provided an apparatus for irradiating light for obtaining a face image of an authentication target, the apparatus including: a first light source unit having a first glancing angle; a second light source unit having a second glancing angle greater than the first glancing angle; an external light information acquisition unit configured to obtain an illuminance of an external light other than the first light source unit and the second light source unit for the authentication target; and a control unit configured to determine a power ratio of a second driving power supplied to the second light source unit to a first driving power supplied to the first light source unit to a preset first value when an illuminance of the external light is smaller than or equal to a predetermined illuminance threshold and control currents to be supplied to the first light source unit and the second light source unit based on the power ratio, wherein the control unit controls the power ratio to a second value smaller than the first value when it is determined that the authentication target is separated by a distance greater than a first threshold based on characteristics of pixels of the face image obtained by an authentication apparatus after the irradiation of the light by the first light source unit and the second light source unit.

The control unit may control a sum of the first driving power and the second driving power to be smaller than or equal to a maximum tolerable value.

The control unit may control a sum of the first driving power and the second driving power to be reduced while maintaining the power ratio when it is determined that the authentication target is separated by a distance smaller than a second threshold smaller than a first threshold based on the characteristics of the pixels of the face image obtained by the authentication apparatus after the irradiation of the light by the first light source unit and the second light source unit.

The control unit may determine a distance from the light irradiation apparatus to the authentication target based on an average illuminance of the entire pixels of the face image obtained by the authentication apparatus.

The first light source unit may include N-number of first light emitting elements having the first glancing angle, N being a natural number greater than or equal to 1; the second light source unit may include M-number of second light emitting elements having the second glancing angle, M being a natural number greater than or equal to 1; and the first light emitting elements may be arranged at a central region in a horizontal direction or in a vertical direction of a light emitting surface and the second light emitting elements are arranged at an outer region of the central region.

The first light source unit may include N-number of first light emitting elements having the first glancing angle, N being a natural number greater than or equal to 1; the second light source unit may include M-number of second light emitting elements having the second glancing angle, M being a natural number greater than or equal to 1; and the first light emitting elements and the second light emitting elements may be arranged alternately on a light emitting surface.

The first light source unit may include N-number of first light emitting elements having the first glancing angle, N being a natural number greater than or equal to 1; the second light source unit may include M-number of second light emitting elements having the second glancing angle, M being a natural number greater than or equal to 1; and an average separated distance from an image pickup device configured to pick up the face image of the authentication target to the first light emitting elements may be greater than an average separated distance from the image pickup device to the second light emitting elements.

In accordance with a third aspect of the present disclosure, there is provided a method of irradiating light for obtaining a face image of an authentication target in a light irradiation apparatus including a first light source unit having a first glancing angle and a second light source unit having a second glancing angle greater than the first glancing angle, the method including: obtaining environment information on external light other than the first light source unit and the second light source unit for the authentication target; determining a power ratio of a second driving power supplied to the second light source unit to a first driving power supplied to the first light source based on the environment information; and supplying currents to the first light source unit and the second light source based on the determined power ratio.

In accordance with a third aspect of the present disclosure, there is provided a method of irradiating light for obtaining a face image of an authentication target in a light irradiation apparatus including a first light source unit having a first glancing angle and a second light source unit having a second glancing angle greater than the first glancing angle, the method including: obtaining an illuminance of external light other than the first light source unit and the second light source unit for the authentication target; determining a power ratio of a second driving power supplied to the second light source unit to a first driving power supplied to the first light source unit to a preset first value when the illuminance of the external light is smaller than or equal to a predetermined illuminance threshold and supplying currents to the first light source unit and the second light source unit based on the preset first value of the power ratio; and controlling the power ratio to a second value smaller than the first value when it is determined that the authentication target is separated by a distance greater than a predetermined distance threshold based on characteristics of pixels of the face image obtained by an authentication apparatus after the irradiation of the light by the first light source unit and the second light source unit.

In accordance with the embodiments of the present disclosure, the current supplied to the light source for irradiating the light for obtaining the face image of the authentication target is adaptively controlled in response to the changes in the surrounding environment. Accordingly, it is possible to control a size of a two-dimensional optimal face authentication region formed at a location separated from the light irradiation apparatus by a predetermined distance in response to the changes in the surrounding environment. Or, it is possible to control a separated distance of the two-dimensional face authentication region from the light irradiation apparatus in response to the changes in the surrounding environment. As a result, the optimal face authentication performance can be constantly provided regardless of the changes in the surrounding environment.

BRIEF DESCRIPTION OF THE DRAWINGS

The objects and features of the disclosure will become apparent from the following description of embodiments, given in conjunction with the accompanying drawings, in which.

DETAILED DESCRIPTION

Advantages, features and methods for achieving them will become apparent from the embodiments which will be described later in detail with reference to the accompanying drawings. However, the present disclosure is not limited to the embodiments described herein below but may be implemented in many different forms. The embodiments are provided to make complete the present disclosure and to completely inform the scope of the present disclosure to a person having an ordinary knowledge in the field to which the present disclosure pertains. The present disclosure is defined only by the claims.

In describing the embodiments of the present disclosure, the detailed descriptions of well-known functions or configurations will be omitted if it is determined that the detailed descriptions of well-known functions or configurations may unnecessarily make obscure the spirit of the present disclosure. The terms to be described later are defined in view of the functions exercised in the embodiments of the present disclosure and may vary depending on the intention of a user or an operator and the practice. Thus, the definition of terms shall be made based on the overall contents of the subject specification.

Figure 1:
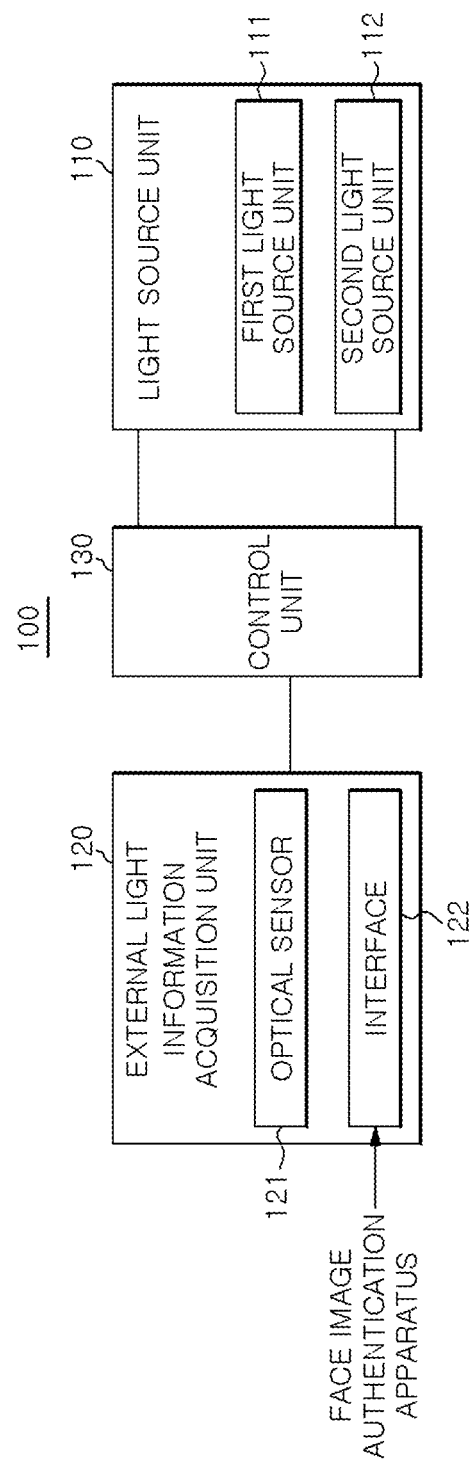
FIG. 1 is a block diagram showing a light irradiation apparatus according to an embodiment.

FIG. 1 is a block diagram showing a light irradiation apparatus according to an embodiment of a present disclosure.

As shown in FIG. 1, the light irradiation apparatus 100 according to an embodiment includes a light source unit 110, an external light information acquisition unit 120 and a control unit 130.

The light source unit 110 includes a first light source unit 111 having a first glancing angle and a second light source unit 112 having a second glancing angle greater than the first glancing angle. Here, the glancing angle of the light source, which is an angle between the light source and both end points of a width of light at a predetermined light reaching distance, is in proportional to a ratio of a width of light at the predetermined light reaching distance to a width of light at a light emitting point of the light source while transmitting the light emitted from the light emitting point. The glancing angle of the light source is the same as an angle of view of the light source. One or more light emitting elements included in the first light source unit 111 and one or more light emitting elements included in the second light source unit 112 may be arranged on the same light emitting surface. Various examples of the arrangement of the light emitting elements included in the light source unit 110 will be described later. The light emitting elements included in the light source unit 110 may be light emitting diodes.

The external light information acquisition unit 120 may include an optical sensor 121 or an interface 122 capable of receiving information on external light other than the light source unit 110 from a face authentication apparatus for performing face authentication by obtaining a face image of an authentication target. The external light information acquisition unit 120 may include any one of the optical sensor 121 and the interface 122 or both of the optical sensor 121 and the interface 122. For example, the optical sensor 121 may be a light receiving diode, and the interface 122 may be a series interface.

The external light information acquisition unit 120 can receive environment information on the external light other than the light source unit 110 for the authentication target from the face authentication apparatus connected through the interface 122.

Here, the environment information on the external light may include an illuminance of the external light. The face authentication apparatus may calculate an average illuminance from brightness of pixels of the face image of the authentication target and transmit the calculated average illuminance to the light irradiation apparatus 100 through the interface 122. The light irradiation apparatus 100 may obtain, as the illuminance of the external light, the average illuminance provided by the face authentication apparatus. Or, the light irradiation apparatus 100 may measure the illuminance of the external light by using the optical sensor 121.

The environment information on the external light may include light uniformity. The light uniformity denotes a ratio of a minimum brightness of a portion having the minimum brightness in a predetermined region to an average brightness in the entire predetermined region while considering effects of the light source unit 110 and ambient light. The face authentication apparatus can calculate the light uniformity from pixels of the face image of the authentication target and transmit the calculated light uniformity to the light irradiation apparatus 100 through the interface 122. The light irradiation apparatus 100 can obtain, as the environment information, the light uniformity provided by the face authentication apparatus. Here, the face authentication apparatus can calculate the light uniformity of the external light from the pixels of the face image obtained from the authentication target before the light irradiation.

The control unit 130 determines a power ratio of a second driving power supplied to the second light source unit 122 to a first driving power supplied to the first light source unit 111 based on the environment information obtained by the external light information acquisition unit 120 and controls currents supplied to the first light source unit 111 and the second light source unit 112 based on the determined power ratio. Here, the environment information may include the illuminance of the external light. The control unit 130 can decrease the power ratio as the illuminance of the external light is increased. For example, when the illuminance of the external light is greater than or equal to a predetermined threshold, the control unit 130 can control the power ratio to be smaller than that in the case where the illuminance of the eternal light is smaller than the predetermined threshold. Further, the control unit 130 can control a sum of the first driving power and the second driving power to be smaller than or equal to a preset maximum tolerable value. The control unit 139 may be realized as a processor such as a CPU (Central Processing Unit) or the like.

The control unit 130 can control the first light source unit 111 and the second light source unit 112 such that light uniformity in a two-dimensional optimal face authentication region that is greater than or equal to a predetermined size and separated from the light irradiation apparatus 100 by a predetermined distance becomes greater than or equal to a uniformity threshold that allows face authentication. Further, the control unit 130 can control the size of the optimal face authentication region to be smaller when the illuminance of the external light is greater than or equal to the predetermined threshold than when the illuminance of the external light is smaller than the predetermined threshold.

Moreover, the control unit 100 can control the first light source unit 111 and the second light source unit 112 not to operate when the light uniformity of the external light is greater than or equal to a first uniformity threshold. This case may be, e.g., a case where light having high uniformity is irradiated to a face of an authentication target by another illumination device such as a self-illumination of a mobile terminal in a dark indoor environment.

The control unit 100 can control the power ratio of the second driving power supplied to the second light source unit 112 to the first driving power supplied to the first light source unit 111 to a preset first value when the light uniformity of the external light is greater than or equal to the second uniformity threshold and smaller than the first uniformity threshold, the second uniformity threshold value being smaller than the first uniformity threshold, e.g., in an indoor environment with light turned on. Further, the control unit 100 can control the power ratio to a second value smaller than the first value when the light uniformity of the external light is smaller than the second uniformity threshold, e.g., in an environment in which sunlight having a high scattering property is irradiated.

The control unit 130 can control currents to be supplied to the first light source unit 111 and the second light source unit 112 based on the power ratio of the second driving power supplied to the second light source unit 112 to the first driving power supplied to the first light source unit 111 which is determined to a preset value when the illuminance of the external light is smaller than or equal to a predetermined illumination threshold. The control unit 130 can control the power ratio to be smaller than the preset value when it is determined that the authentication target is separated by a distance greater than the first threshold based on characteristics of the pixels of the face image obtained by the face authentication apparatus after the light is irradiated by the first light source unit 111 and the second light source unit 112. Here, the control unit 130 can control a sum of the first driving power and the second driving power to be smaller than or equal to a preset maximum tolerable value. Here, the control unit 130 can determine a distance from the light irradiation apparatus 100 to the authentication target based on an average illuminance of the entire pixels of the face image obtained by the face authentication apparatus.

Further, the control unit 130 can reduce the sum of the first driving power and the second driving power while maintaining the power ratio at the preset value when it is determined that the authentication target is separated by a distance smaller than the second threshold smaller than the first threshold based on the characteristics of the pixels of the face image obtained by the face authentication apparatus after the light is irradiated by the first light source unit 111 and the second light source unit 112.

FIGS. 2 to 9 show various examples of arrangement of light emitting elements constituting the light source unit 110 in the light irradiation apparatus 100 according to the present embodiment.

The first light source unit 111 of the light source unit 110 includes N-number (N being a natural number greater than or equal to 1) of first light emitting elements 110a having a first glancing angle. The second light source unit 112 includes M-number (M being a natural number greater than or equal to 1) of second light emitting elements 110b having a second glancing angle.

A shape of a light emitting surface of the light source unit 110 which is determined by the arrangement of the N-number of first light emitting elements 110a and the M-number of second light emitting elements 110b may be a polygonal shape, a circular shape, an elliptical shape other than a quadrangular shape shown in FIGS. 2 to 9.

The light emitting surface of the light source unit 110 becomes substantially perpendicular to the ground when installed and used. Therefore, hereinafter, a horizontal direction 10 and a vertical direction 11 of the light emitting surface respectively represent the left-right direction and the up-down direction shown in FIGS. 2 to 9.

On the light emitting surface of the light source unit 110, the first light emitting elements 110a may be arranged at a central region in the horizontal direction 10 or in the vertical direction 11 and the second light emitting elements 110b may be arranged at an outer region. Or, the first light emitting elements 110a and the second light emitting elements 110b may be arranged alternately.

Figure 2:
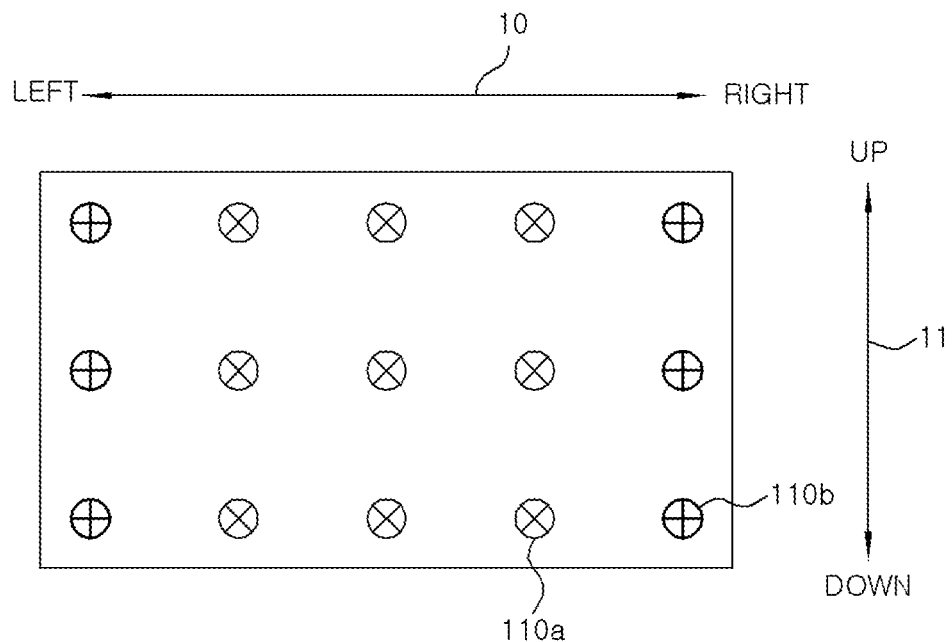
FIGS. 2 to 9 show various examples of arrangement of light emitting elements constituting a light source unit in the light irradiation apparatus according to the embodiment.
Figure 3:
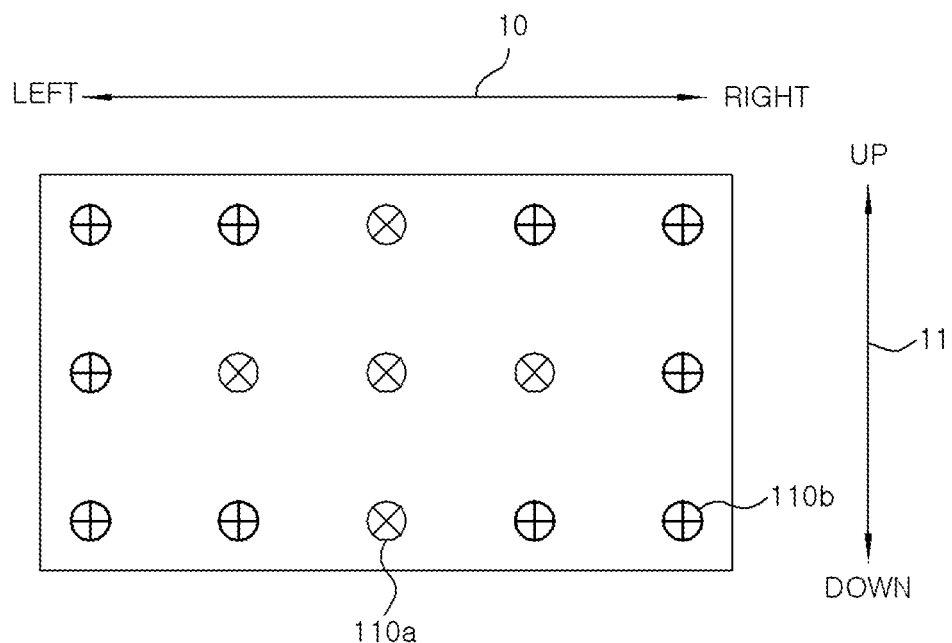
Figure 4:
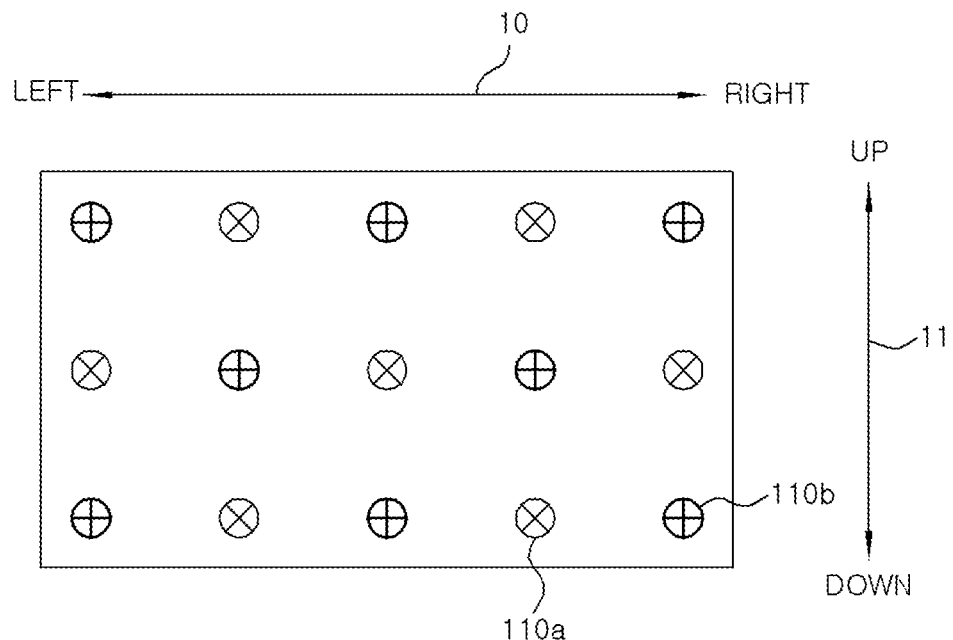
Figure 5:
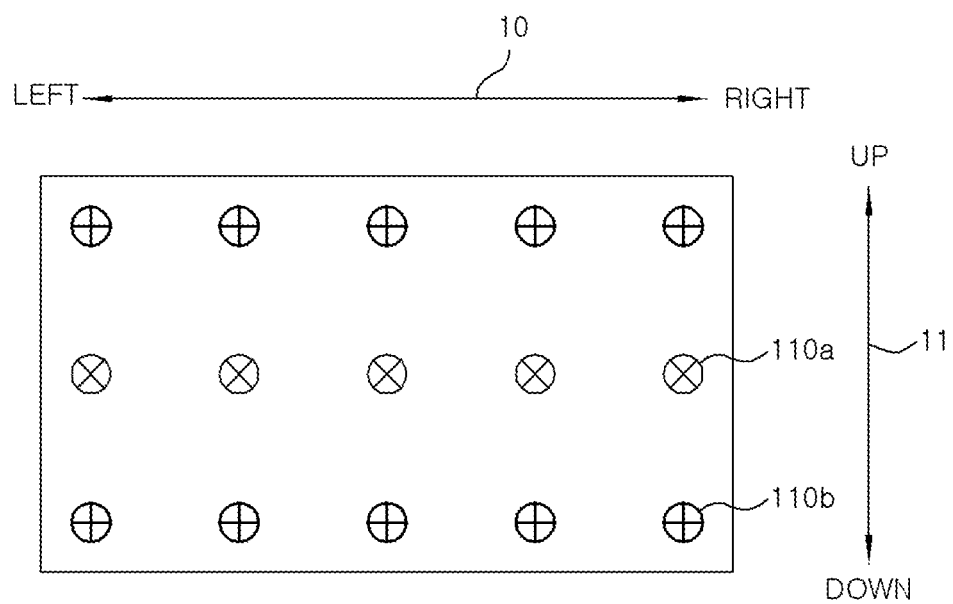
Figure 6:
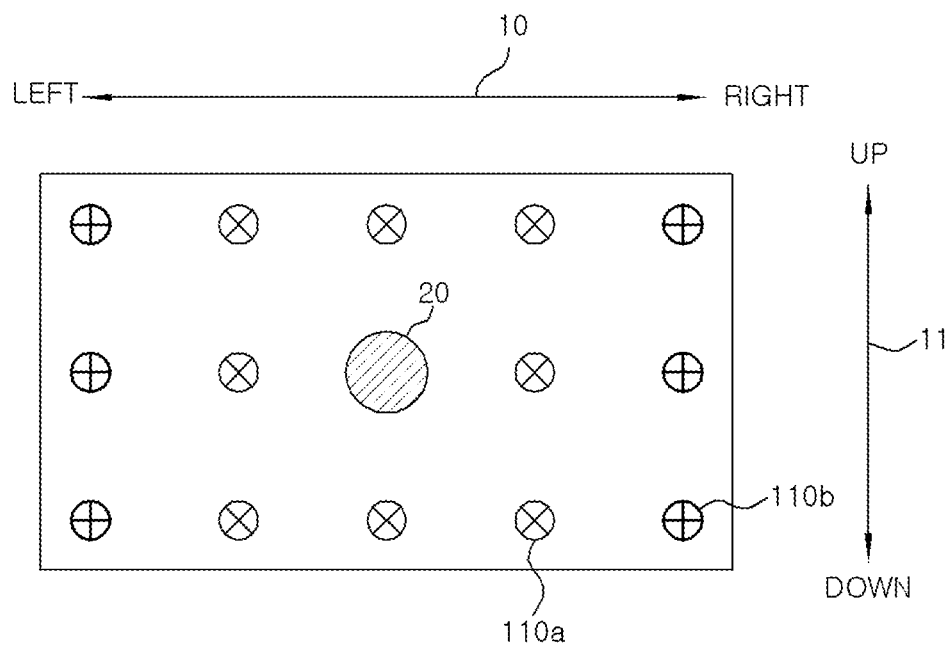
Figure 7:
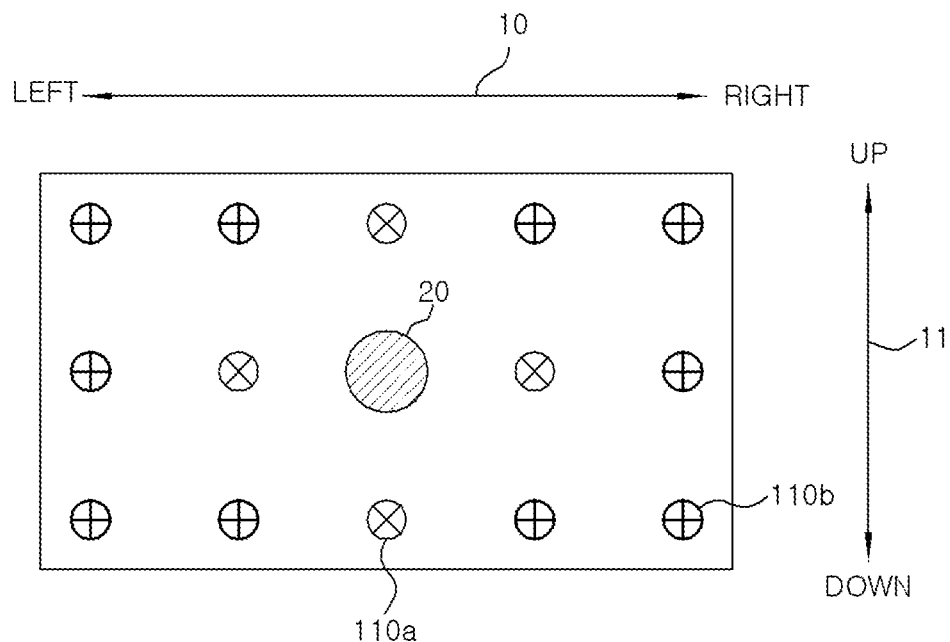
Figure 8:
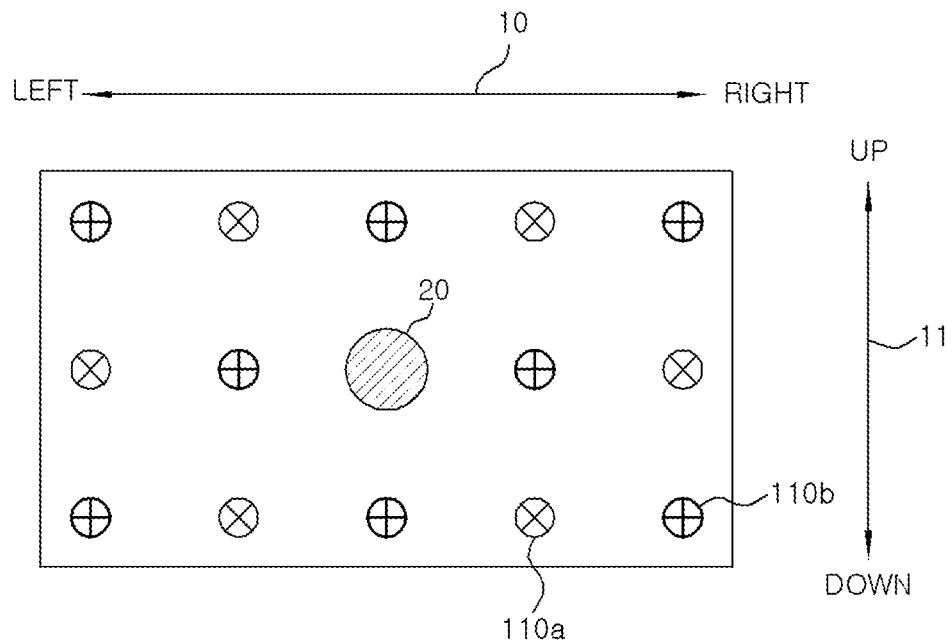
Figure 9:
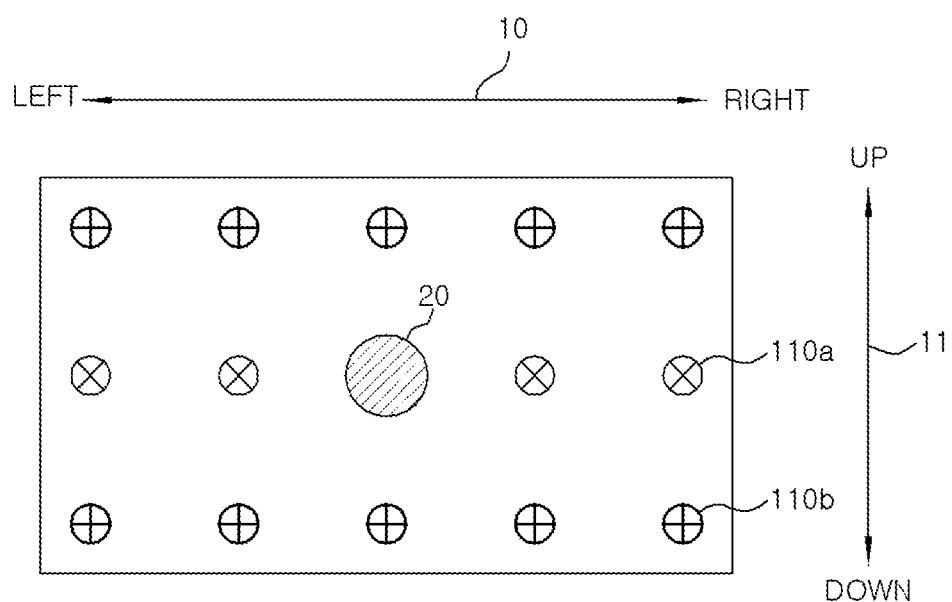

For example, when the light emitting surface of the light source unit 110 has a rectangular shape, the first light emitting elements 110a may be arranged in a square shape at the central region in the horizontal direction 10 and the second light emitting elements 110b may be arranged at a right outer region and a left outer region, as can be seen from FIG. 2. Or, the first light emitting elements 110a may be arranged in a lozenge shape at the central region in the horizontal direction 10 and the second light emitting elements 110b may be arranged at a right outer region and a left outer region, as can be seen from FIG. 3. Or, the second light emitting elements 110b may be arranged in a lozenge shape at the central region in the horizontal direction 10 and the first light emitting elements 110a and the second light emitting elements 110b may be mixedly arranged at a right outer region and a left outer region, as can be seen from FIG. 4. Or, the first light emitting elements 110a may be arranged in an intermediate line in the vertical direction 11 among a plurality of horizontal lines and the second light emitting elements 110b may be arranged in an upper and a lower line thereof, as can be seen from FIG. 5.

FIGS. 6 to 9 show various examples of arrangement of light emitting elements in the case of positioning on the light emitting surface of the light source unit 110 an image pickup device 20 for obtaining a face image of an authentication target in the face authentication apparatus for performing the face authentication by obtaining the face image of the authentication target. As shown in FIGS. 6 to 9, when the light emitting surface of the light source unit 110 has a rectangular shape, the image pickup device 20 may be positioned at a center and the first light emitting elements 110a and the second light emitting elements 110b may be arranged at an outer region. In the examples shown in FIGS. 6, 7 and 9 among FIGS. 6 to 9, an average separated distance from the image pickup device 20 to the M-number of second light emitting elements 110b is greater than an average separated distance from the image pickup device 20 to the N-number of first light emitting elements 110a.

Figure 10:
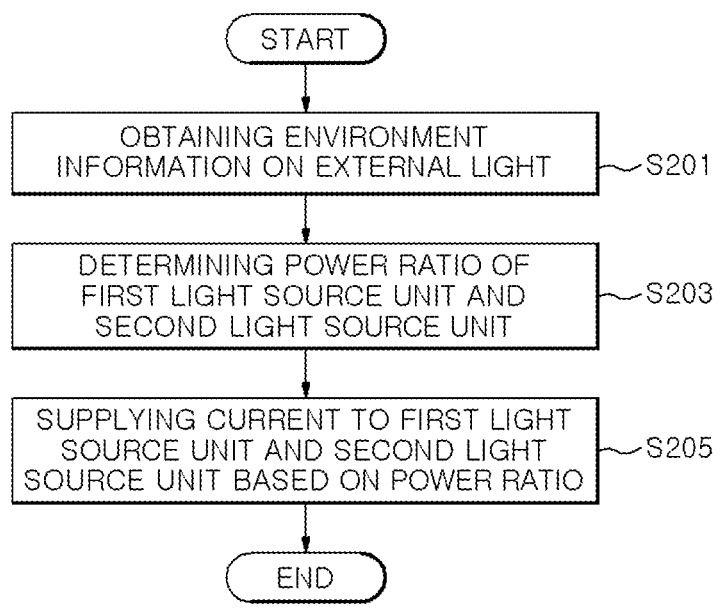
FIG. 10 is a flowchart for explaining a light irradiation method according to an embodiment.

FIG. 10 is a flowchart for explaining a light irradiation method for obtaining a face image of a authentication target according to an embodiment in the light irradiation apparatus including the first light source unit having the first glancing angle and the second light source unit having the second glancing angle greater than the first glancing angle.

The light irradiation method according to the present embodiment will be described with reference to FIGS. 1, 10, 12 and 13.

The light irradiation method according to the present embodiment includes a step S201 in which the external light information acquisition unit 120 obtains environment information on the external light other than the first light source unit 111 and the second light source unit 112 for the authentication target.

Here, the environment information on the external light may include an illuminance of the external light. When the external light information acquisition unit 120 includes the interface 122, the face authentication apparatus calculates an average illuminance from the pixels of the face image of the authentication target and transmits the calculated average illuminance to the light irradiation apparatus 100 through the interface 122. The light irradiation apparatus 100 obtains, as the illuminance of the external light, the average illuminance provided by the face authentication apparatus. When the external light information acquisition unit 120 includes the optical sensor 121, the light irradiation apparatus 100 can directly measure the illuminance of the external light by using the optical sensor 121.

The environment information on the external light may include the light uniformity of the external light. When the external light information acquisition unit 120 includes the interface 122, the face authentication apparatus can calculate the light uniformity of the external light from the pixels of the face image of the authentication target and transmit the calculated light uniformity to the light irradiation apparatus 100 through the interface 122. The light irradiation apparatus 100 obtains, as the environment information, the light uniformity provided by the face authentication apparatus. Here, the face authentication apparatus calculates the light uniformity of the external light from the pixels of the face image obtained from the authentication target before the light irradiation of the light source unit 110.

The light irradiation method according to the present embodiment further includes a step S203 in which the control unit 130 determines a power ratio of the second driving power supplied to the second light source unit 112 to the first driving power supplied to the first light source unit 111 based on the environment information on the external light which is obtained by the external light information acquisition unit 120 in the step S201. The light irradiation method according to the present embodiment further includes a step S205 in which the control unit 130 controls the first light source unit 111 and the second light source unit 112 based on the power ratio determined in the step S203 and supplies currents corresponding to the power ratio determined in the step S203 to the first and the second light source unit 111 and 122.

Here, the environment information may include the illuminance of the external light. The control unit 130 controls the power ratio of the second driving power supplied to the second light source unit 112 to the first driving power supplied to the first light source unit 111 in response to the illuminance of the external light. In other words, the control unit 130 controls the power ratio of the second driving power supplied to the second light source unit 112 to the first driving power supplied to the first light source unit 111 to be smaller when the illuminance of the external light is greater than or equal to a predetermined threshold than when the illuminance of the external light is smaller than the predetermined threshold. At this time, the power that can be used by the light irradiation apparatus 100 is limited and, thus, the control unit 130 controls a sum of the first driving power supplied to the first light source unit 111 and the second driving power supplied to the second light source unit 112 to be smaller than or equal to the preset maximum tolerable value.

The case where the illuminance of the external light is smaller than the predetermined threshold may correspond to the case where the light irradiation apparatus 100 and the face authentication apparatus may operate in an indoor environment. In such an indoor environment, when a two-dimensional optimal face authentication region greater than or equal to a predetermined size is separated from the light source unit 110 by a predetermined distance $R_1$, the optimal face authentication region is formed between a boundary of a light reaching region $W_1$ by the second light source unit 112 having the second glancing angle 103 and a boundary of a light reaching region $W_2$ by the first light source unit 111 having the first glancing angle 101, as can be seen from FIG. 12. In other words, the control unit 130 controls the first light source unit 111 and the second light source unit 112 such that the light uniformity becomes greater than or equal to the uniformity threshold that allows face authentication in an optimal face authentication region $W_3$ smaller than the light reaching region $W_1$ by the second light source unit 112 and greater than the light reaching region $W_2$ by the first light source unit 111. Accordingly, the biometric authentication apparatus can obtain a face image having a quality that allows face authentication at any location of the optimal face authentication region $W_3$.

The case where the illuminance of the external light is greater than or equal to the predetermined threshold may be correspond to the case where the light irradiation apparatus 100 and the face authentication apparatus operate in an outdoor environment. In such an outdoor environment, when a two-dimensional optimal face authentication region greater than or equal to a predetermined size is separated from the light source unit 110 by a predetermined distance $R_1$, the optimal face authentication region is formed within the boundary of the light reaching region $W_2$ by the first light source unit 111 having the first glancing angle 101 smaller than the second glancing angle 103 of the second light source unit 112, as can be seen from FIG. 13. In other words, the control unit 130 controls the first light source unit 111 and the second light source unit 112 such that the light uniformity becomes greater than or equal to the uniformity threshold that allows face authentication in an optimal face authentication region $W_4$ smaller than the light reaching region $W_2$ by the first light source unit 111. Accordingly, the biometric authentication apparatus can obtain a face image having a quality that allows face authentication only when the authentication target is positioned within the optimal face authentication region $W_4$ separated from the light source unit 110 by the predetermined distance $R_1$. As the optimal face authentication region is increased, the convenience in using the face authentication apparatus is improved. However, the power consumption of the light source unit 110 at which the light uniformity of the optimal face authentication region becomes greater than the uniformity threshold that allows face authentication is also increased. Therefore, the limited power that can be used by the light irradiation apparatus 100 may be insufficient in the case of forming a large optimal face authentication region in an outdoor environment affected by the external light. However, the entire power consumption of the light irradiation apparatus 100 does not exceed the limit in the case of forming the optimal face authentication region $W_4$ smaller than the light reaching region $W_2$ by the first light source unit 111. At this time, in order to focus the irradiation of the light on the optimal face authentication region $W_4$, a part or all of the light emitting elements included in the second light source unit 112 may not be driven or a supplied current may be reduced compared to that in the indoor environment.

A plurality of illuminance thresholds for the illuminance of the external light is preset and a plurality of different power ratios corresponding to the illuminance thresholds is set. A plurality of predetermined distance thresholds and the power ratios may be stored in the form of a data table in an internal memory of the control unit 130 or in an additional memory. In that case, in the step S203, the control unit 130 consecutively calculates a separated distance between the light source unit 110 and the authentication target by obtaining variation of characteristics of pixels of face images consecutively obtained by the image pickup device, retrieves a predetermined distance threshold close to the calculated separated distance from the data table, and extracts a power ratio corresponding thereto. In the step S205, the power ratio of the second driving power supplied to the second light source unit 112 to the first driving power supplied to the first light source unit 111 is consecutively controlled in response to the extracted power ratio. Accordingly, it is possible to control the power ratio to be decreased as the illuminance of the external light is increased. As a result, the area of the optimal face authentication region can be consecutively controlled.

The control unit 100 can control the first light source unit 111 and the second light source unit 112 not to operate when the light uniformity of the external light is greater than or equal to the first uniformity threshold based on the environment information obtained in the step S201. This case may be, e.g., a case where light having high uniformity is irradiated to a face of a authentication target by another illumination device such as a self-illumination of a mobile terminal or the like in a dark indoor environment. The power can be saved when it is not necessary to operate the light source unit 110 due to the irradiation of the light having high light uniformity to the face of the authentication target by another illumination device.

The control unit 100 can control the power ratio of the second driving power supplied to the second light source unit 112 to the first driving power supplied to the first light source unit 111 to the preset first value when the light uniformity of the external light is greater than or equal to the second uniformity threshold and smaller than the first uniformity threshold, the second uniformity threshold being smaller than the first uniformity threshold, e.g., in an indoor environment with light turned on. In that case, the first light source unit 111 and the second light source unit 112 are controlled such that the light uniformity becomes greater than or equal to the uniformity threshold that allows face authentication in the optimal face authentication region $W_3$ greater than the light reaching region $W_2$ by the first light source unit 111 and smaller than the light reaching region $W_1$ by the second light source unit 112, as can be seen from FIG. 12.

The control unit 100 can adjust and control the power ratio of the second driving power supplied to the second light source unit 112 to the first driving power supplied to the first light source unit 111 to the second value smaller than the first value when the light uniformity of the external light is smaller than the second uniformity threshold, e.g., in an environment in which sunlight having a high scattering property is irradiated. In this case, the first light source unit 111 and the second light source unit 112 are controlled such that the light uniformity of the optimal face authentication region $W_4$ smaller than the light reaching region $W_2$ by the first light source unit 111 becomes greater than or equal to the uniformity threshold that allows face authentication, as can be seen from FIG. 13.

Figure 11:
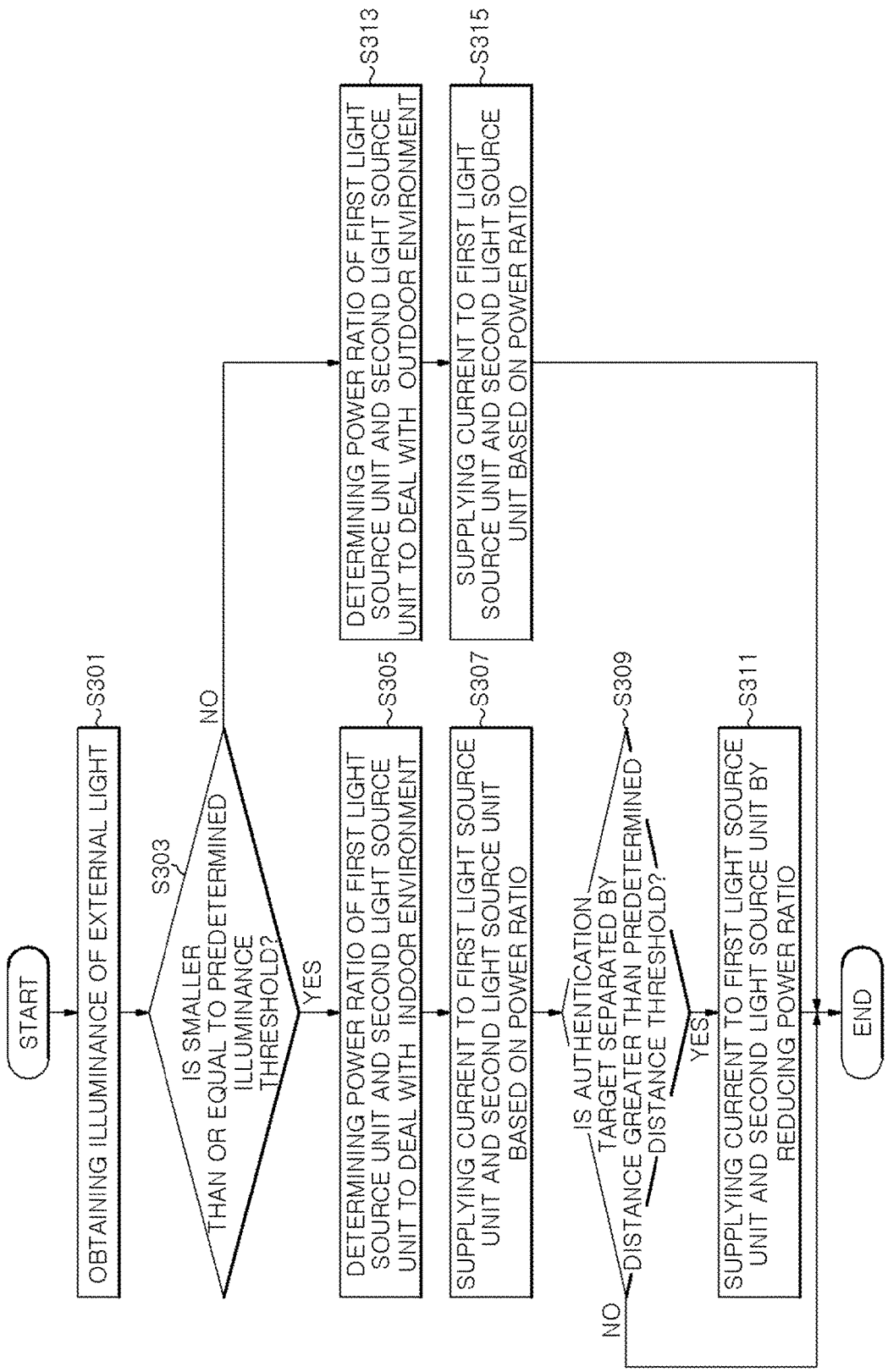
FIG. 11 is a flowchart for explaining a light irradiation method according to another embodiment.

FIG. 11 is a flowchart for explaining a method for irradiating light for obtaining a face image of a authentication target according to another embodiment in the light irradiation apparatus including the first light source unit having a first glancing angle and the second light source unit having a second glancing angle greater than the first glancing angle.

The light irradiation method according to another embodiment will be described with reference to FIGS. 1, 11, 12 and 14.

The light irradiation method according to another embodiment includes a step S301 in which the external light information acquisition unit 120 obtains an illuminance of an external light other than the first light source unit 111 and the second light source unit 112 for the authentication target. The step S301 is the same as or similar to the aforementioned step S201. Therefore, detailed description thereof will be omitted.

The light irradiation method according to another embodiment further includes: a step S303 of determining whether or not the illuminance of the external light is smaller than or equal to a predetermined illuminance threshold; a step S305 in which the control unit 130 determines, when it is determined in the step S303 that the illuminance of the external light is smaller than or equal to the predetermined illuminance threshold, a power ratio of the second driving power supplied to the second light source unit 112 to the first driving power supplied to the first light source unit 111 to a preset value in order to deal with the indoor environment; and a step S307 of controlling the first light source unit 111 and the second light source unit 112 based on the power ratio and supplying currents corresponding to the power ratio determined in the step S305 to the first light source unit 111 and the second light source unit 112. The steps S303 to S307 are executed in the same or similar manner as the aforementioned steps S203 and S205 in which it is considered that the light irradiation apparatus 100 and the face authentication apparatus operate in the indoor environment and the first light source unit 111 and the second light source unit 112 are controlled such that the light uniformity of the optimal face authentication region $W_4$ formed within the boundary of the light reaching region $W_6$ by the second light source unit 112 becomes greater than or equal to the uniformity threshold that allows face authentication. Therefore, detailed description thereof will be omitted.

The light irradiation method according to another embodiment further includes: a step S309 of determining whether or not the authentication target is separated by a distance greater than the predetermined distance threshold based on the characteristics of the pixels of the face image obtained by the face authentication apparatus after the irradiation of the light by the first light source unit 111 and the second light source unit 112; and a step S311 of further reducing the power ratio compared to that in the step S307.

Figure 12:
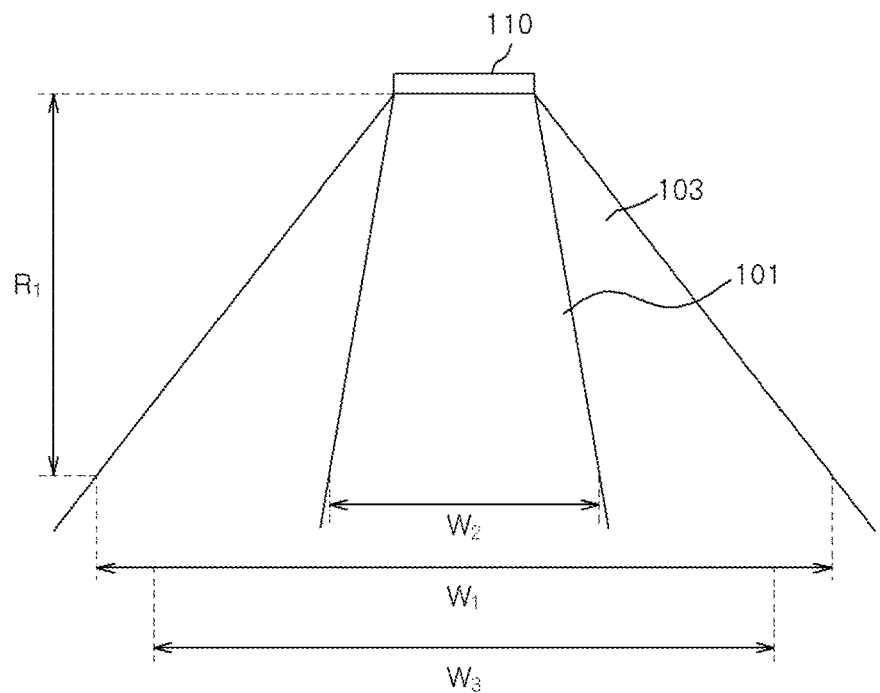
FIGS. 12 to 14 show variation of a light glancing angle and a light reaching distance by the light source unit in the light irradiation apparatus according to the embodiment.
Figure 13:
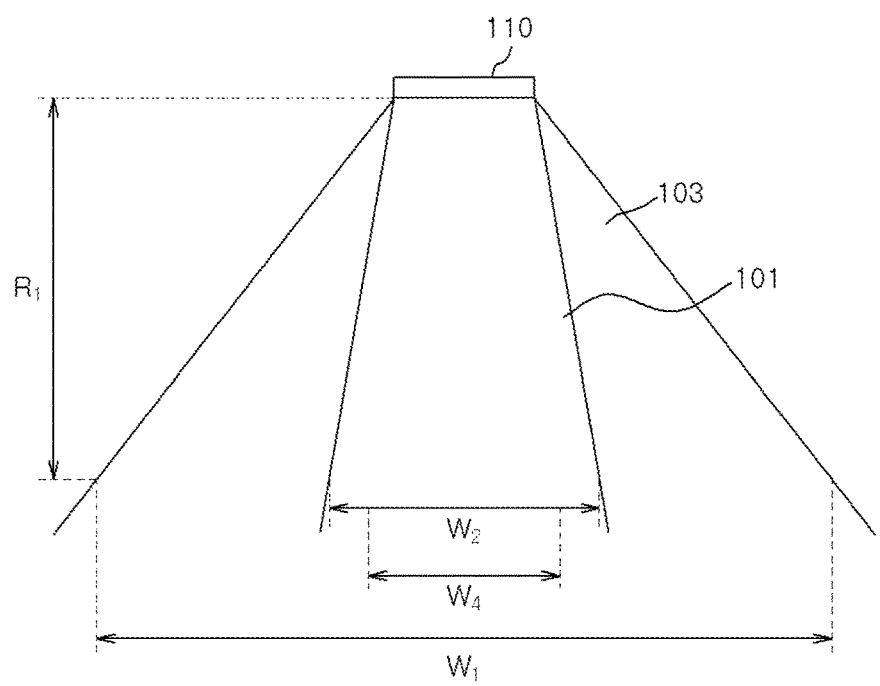

In the step S307, as described with reference to FIG. 12, the face authentication apparatus obtains the face image by using the image pickup device on the assumption that the authentication target is separated from the light source unit 110 by the predetermined distance $R_1$ because the optimal face authentication region is formed at a location separated from the light source unit 110 by the predetermined distance $R_1$. The characteristics of the pixels of the face image obtained by the image pickup device when the authentication target is separated from the light source unit 110 by a distance greater than the predetermined distance $R_1$ are different from the characteristics of the pixels of the face image obtained when the authentication target is separated from the light source unit 110 by the predetermined distance $R_1$. For example, when the brightness of the pixels is too low to extract the feature information for verifying the face image, the face authentication apparatus determines that the authentication target is separated by a distance greater than the predetermined distance threshold and transmits the determination result to the light irradiation apparatus 100 through the interface 122.

Figure 14:
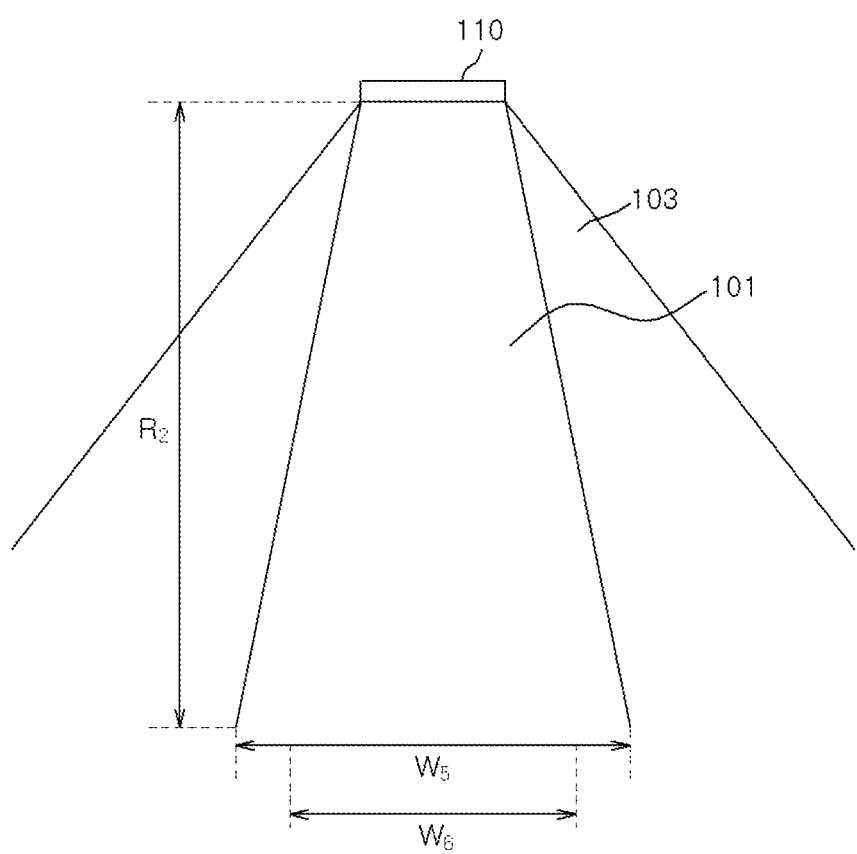

When receiving the determination result that the authentication target is separated by a distance greater than the predetermined distance threshold, the control unit 130 controls the first light source unit 111 and the second light source unit 112 such that a two-dimensional optimal face authentication region is formed at a location separated from the light source unit 110 by a distance $R_2$ greater than the predetermined distance $R_1$, as can be seen from FIG. 14. In other words, the control unit 130 controls the first light source unit 111 and the second light source unit 112 such that the light uniformity of the optimal face authentication region $W_6$ formed within the boundary of the light reaching region $W_5$ by the first glancing angle 101 of the first light source unit 111 while being separated from the light source unit 110 by the distance $R_2$ greater than the predetermined distance $R_1$ becomes greater than or equal to the uniformity threshold that allows face authentication. Accordingly, the biometric authentication apparatus can obtain the face image having a quality that allows face authentication when the authentication target is positioned within the optimal face authentication region $W_6$ while being separated from the light source unit 110 by the distance $R_2$ greater than the predetermined distance $R_1$. As the optimal face authentication region is increased, the convenience in using the face authentication apparatus is improved. However, the power consumption of the light source unit 110 at which the light uniformity of the optimal face authentication region becomes greater than the uniformity threshold that allows face authentication is also increased. Therefore, the limited power that can be used by the light irradiation apparatus 100 may be insufficient in the case of forming an optimal face authentication region greater than the light reaching region $W_5$ by the first glancing angle 101 of the first light source unit 111 at a location separated from the light source unit 110 by the distance $R_2$ greater than the predetermined distance $R_1$. However, the entire power consumption of the light irradiation apparatus 100 does not exceed the limit in the case of forming the optimal face authentication region $W_6$ smaller than the light reaching region $W_5$ by the first light source unit 111. At this time, in order to focus the irradiation of the light on the optimal face authentication region $W_6$, a part or all of the light emitting elements included in the second light source unit 112 may not be driven or a supplied current may be reduced compared to that in the case of forming an optimal face authentication region at a location separated from the light source unit 110 by the predetermined distance $R_1$.

A plurality of thresholds of the distance between the light source unit 110 and the authentication target is preset and a plurality of different power ratios corresponding to the distance thresholds is set. The predetermined distance thresholds and the power ratios may be stored in the form of a data table in an internal memory of the control unit 130 or in an additional memory. In that case, in the step S309, the control unit 130 consecutively calculates a separated distance between the light source unit 110 and the authentication target by obtaining variation of characteristics of pixels of face images consecutively obtained by the image pickup device, retrieves a predetermined distance threshold close to the calculated separated distance from the data table, and extracts a power ratio corresponding thereto. In the step S311, the power ratio of the second driving power supplied to the second light source unit 112 to the first driving power supplied to the first light source unit 111 is consecutively controlled in response to the extracted power ratio. Accordingly, it is possible to control the power ratio to be decreased as the separated distance between the light source unit 110 and the authentication target is increased. As a result, the separated distance between the light source unit 110 and the location of the optimal face authentication region can be consecutively controlled.

The light irradiation method according to another embodiment may further include: a step S313 of determining, when it is determined in the step S303 that the illuminance of the external light is greater than the predetermined illuminance threshold, the power ratio of the second driving power supplied to the second light source unit 112 to the first driving power supplied to the first light source unit 111 to a preset value in order to deal with the outdoor environment; and a step S315 of controlling the first light source unit 111 and the second light source unit 112 based on the power ratio and supplying currents corresponding to the power ratio determined in the step S313 to the first light source unit 111 and the second light source unit 112. The steps S313 and S315 are executed in the same or similar manner as the steps S203 and S205 in which it is considered that the light irradiation apparatus 100 and the face authentication apparatus operate in the outdoor environment and the first light source unit 111 and the second light source unit 112 are controlled such that the light uniformity of the optimal face authentication region $W_4$ exclusively becomes greater than or equal to the uniformity threshold that allows face authentication. Therefore, detailed description thereof will be omitted.

As described above, in accordance with the embodiments, the current supplied to the light source unit 110 for irradiating light for obtaining a face image of a authentication target is adaptively controlled in response to changes in surrounding environment. Therefore, the sizes of the two-dimensional optimal face authentication regions $W_3$, $W_4$ and $W_6$ formed at locations separated from the light irradiation apparatus 100 by predetermined distances can be controlled in response to the changes in the surrounding environment. The separated distances of the two-dimensional optimal face authentication regions $W_3$, $W_4$ and $W_6$ from the light irradiation apparatus 100 can be controlled in response to the changes in the surrounding environment. Accordingly, the optimal face authentication performance can be constantly provided regardless of the changes in the surrounding environment.

The combinations of the respective blocks of the accompanying drawings and the respective steps of the flowchart may be performed by computer program instructions. The computer program instructions may be installed in a general-purpose computer, a special-purpose computer or a processor of other programmable data processing devices. Thus, the instructions performed by a computer or a processor of other programmable data processing devices may generate a means for performing the functions of the respective blocks of the block diagrams or the functions described at the respective steps of the flowchart.

Furthermore, the computer program instructions may be stored a computer-usable or computer-readable memory capable of aiming at a computer or other programmable data processing devices in order to realize a function in a specified manner. Thus, the instructions stored in the computer-usable or computer-readable memory may manufacture a production item including an instruction means for performing the functions of the respective blocks of the block diagrams or the functions described at the respective steps of the flowchart.

In this regard, the computer program instructions may be installed on a computer or other programmable data processing devices. Thus, the instructions that operates a computer or other programmable data processing devices by performing a series of operation steps on the computer or other programmable data processing devices and generating a process executed by the computer may provide steps for executing the functions of the respective blocks of the block diagrams or the functions described at the respective steps of the flowchart.

Furthermore, the respective blocks or the respective steps may indicate a module, a segment, or a part of codes including at least one or more executable instructions for executing a specified logical function (specified logical functions). It should be noted that in some alternative embodiments, the functions referred to in the blocks or steps may be performed in different orders. For example, two blocks or steps illustrated one after another may be performed substantially at the same time or may often be performed in the reverse order depending on the corresponding function.

The foregoing descriptions are nothing more than exemplary descriptions of the technical concept of the present disclosure. A person having an ordinary knowledge in the technical field to which the present disclosure pertains will be able to easily understand that many different substitutions, modifications and changes can be made without departing from the essential characteristics of the present disclosure. That is to say, the embodiments disclosed herein are not intended to limit the technical concept of the present disclosure but are intended to describe the technical concept of the present disclosure. The scope of the technical concept of the present disclosure shall not be limited by these embodiments.

Accordingly, the protection scope of the present disclosure shall be construed based on the appended claims. All the technical concepts falling within the scope equivalent to the claims shall be construed to be included in the protection scope of the present disclosure.

What is claimed is:

1. An apparatus for irradiating light for obtaining a face image of an authentication target, the apparatus comprising:
a first light source unit having a first view angle;
a second light source unit having a second view angle greater than the first view angle;
an external light information acquisition unit configured to acquire environment information on an external light other than the first light source unit and the second light source unit for the authentication target; and
a control unit configured to determine a power ratio of a second driving power supplied to the second light source unit to a first driving power supplied to the first light source unit based on the environment information and control currents to be supplied to the first light source unit and the second light source unit based on the power ratio,
wherein the environment information includes an illuminance of the external light, and
the control unit reduces the power ratio as the illuminance of the external light is increased, and
wherein the control unit controls the first light source unit and the second light source unit such that light uniformity in a two-dimensional optimal face authentication region that is greater than or equal to a predetermined size and separated from the light irradiation apparatus by a predetermined distance becomes greater or equal to a uniformity threshold that allows face authentication, and
the control unit controls a size of the optimal face authentication region which is obtained when an illuminance of the external light is greater than or equal to the predetermined threshold to be smaller than a size of the optimal face authentication region which is obtained when the illuminance of the external light is smaller than the predetermined threshold.

2. The apparatus of claim 1, wherein the control unit controls a sum of the first driving power and the second driving power to be smaller than or equal to a preset maximum tolerable value.

3. The apparatus of claim 1, wherein the light irradiation apparatus obtains the illuminance of the external light by using an average illuminance calculated from pixels of the face image obtained from the authentication target.

4. The apparatus of claim 1, wherein the external light information acquisition unit includes an optical sensor configured to measure an illuminance of the external light, and the environment information is measured by the optical sensor.

5. An apparatus for irradiating light for obtaining a face image of an authentication target, the apparatus comprising:
a first light source unit having a first view angle;
a second light source unit having a second view angle greater than the first view angle;
an external light information acquisition unit configured to acquire environment information on an external light other than the first light source unit and the second light source unit for the authentication target; and
a control unit configured to determine a power ratio of a second driving power supplied to the second light source unit to a first driving power supplied to the first light source unit based on the environment information and control currents to be supplied to the first light source unit and the second light source unit based on the power ratio,
wherein the environment information includes light uniformity of the external light, and
the control unit controls the first light source unit and the second light source unit not to operate when light uniformity of the external light is greater than a first uniformity threshold, controls the power ratio to a preset value when the light uniformity of the external light is greater than or equal to a second uniformity threshold and smaller than the first uniformity threshold, the second uniformity threshold being smaller than the first uniformity threshold, and controls the power ratio to be reduced when the light uniformity of the external light is smaller than the second uniformity threshold.

6. The apparatus of claim 5, wherein the light irradiation apparatus uses the light uniformity of the external light which is calculated from pixels of a face image obtained from the authentication target before the irradiation of the light by the first light source unit and the second light source unit.

7. The apparatus of claim 1, wherein the first light source unit includes N-number of first light emitting elements having the first view angle, N being a natural number greater than or equal to 1;
the second light source unit includes M-number of second light emitting elements having the second view angle, M being a natural number greater than or equal to 1; and
the first light emitting elements are arranged at a central region in a horizontal direction or in a vertical direction of a light emitting surface and the second light emitting elements are arranged at an outer region of the central region.

8. The apparatus of claim 1, wherein the first light source unit includes N-number of first light emitting elements having the first view angle, N being a natural number greater than or equal to 1;
the second light source unit includes M-number of second light emitting elements having the second view angle, M being a natural number greater than or equal to 1; and
the first light emitting elements and the second light emitting elements are arranged alternately on a light emitting surface.

9. The apparatus of claim 1, wherein the first light source unit includes N-number of first light emitting elements having the first view angle, N being a natural number greater than or equal to 1;
the second light source unit includes M-number (of second light emitting elements having the second view angle, M being a natural number greater than or equal to 1; and
an average separated distance from an image pickup device configured to pick up the face image of the authentication target to the first light emitting elements is greater than an average separated distance from the image pickup device to the second light emitting elements.

10. An apparatus for irradiating light for obtaining a face image of an authentication target, the apparatus comprising:
a first light source unit having a first view angle;
a second light source unit having a second view angle greater than the first view angle;
an external light information acquisition unit configured to obtain an illuminance of an external light other than the first light source unit and the second light source unit for the authentication target; and
a control unit configured to determine a power ratio of a second driving power supplied to the second light source unit to a first driving power supplied to the first light source unit to a preset first value when an illuminance of the external light is smaller than or equal to a predetermined illuminance threshold and control currents to be supplied to the first light source unit and the second light source unit based on the power ratio,
wherein the control unit controls the power ratio to a second value smaller than the first value when it is determined that the authentication target is separated by a distance greater than a first threshold based on characteristics of pixels of the face image obtained by an authentication apparatus after the irradiation of the light by the first light source unit and the second light source unit.

11. The apparatus of claim 10, wherein the control unit controls a sum of the first driving power and the second driving power to be smaller than or equal to a maximum tolerable value.

12. The apparatus of claim 10, wherein the control unit controls a sum of the first driving power and the second driving power to be reduced while maintaining the power ratio when it is determined that the authentication target is separated by a distance smaller than a second threshold smaller than a first threshold based on the characteristics of the pixels of the face image obtained by the authentication apparatus after the irradiation of the light by the first light source unit and the second light source unit.

13. The apparatus of claim 10, wherein the control unit determines a distance from the light irradiation apparatus to the authentication target based on an average illuminance of the entire pixels of the face image obtained by the authentication apparatus.

14. The apparatus of claim 10, wherein the first light source unit includes N-number of first light emitting elements having the first view angle, N being a natural number greater than or equal to 1;
the second light source unit includes M-number of second light emitting elements having the second view angle, M being a natural number greater than or equal to 1; and
the first light emitting elements are arranged at a central region in a horizontal direction or in a vertical direction of a light emitting surface and the second light emitting elements are arranged at an outer region of the central region.

15. The apparatus of claim 10, wherein the first light source unit includes N-number of first light emitting elements having the first view angle, N being a natural number greater than or equal to 1;
the second light source unit includes M-number of second light emitting elements having the second view angle, M being a natural number greater than or equal to 1; and
the first light emitting elements and the second light emitting elements are arranged alternately on a light emitting surface.

16. The apparatus of claim 10, wherein the first light source unit includes N-number of first light emitting elements having the first view angle, N being a natural number greater than or equal to 1;
the second light source unit includes M-number of second light emitting elements having the second view angle, M being a natural number greater than or equal to 1; and
an average separated distance from an image pickup device configured to pick up the face image of the authentication target to the first light emitting elements is greater than an average separated distance from the image pickup device to the second light emitting elements.

17. A method of irradiating light for obtaining a face image of an authentication target in a light irradiation apparatus including a first light source unit having a first view angle and a second light source unit having a second view angle greater than the first view angle, the method comprising:

obtaining environment information on external light other than the first light source unit and the second light source unit for the authentication target;

determining a power ratio of a second driving power supplied to the second light source unit to a first driving power supplied to the first light source based on the environment information; and controlling currents to be supplied to the first light source unit and the second light source based on the determined power ratio, wherein the environment information includes an illuminance of the external light, and in the determining the power ratio, the power ratio is reduced as the illuminance of the external light is increased, and wherein, in the controlling the currents, the first light source unit and the second light source unit are controlled such that light uniformity in a two-dimensional optimal face authentication region that is greater than or equal to a predetermined size and separated from the light irradiation apparatus by a predetermined distance becomes greater or equal to a uniformity threshold that allows face authentication, and a size of the optimal face authentication region which is obtained when an illuminance of the external light is greater than or equal to the predetermined threshold is controlled to be smaller than a size of the optimal face authentication region which is obtained when the illuminance of the external light is smaller than the predetermined threshold.

18. A method of irradiating light for obtaining a face image of an authentication target in a light irradiation apparatus including a first light source unit having a first view angle and a second light source unit having a second view angle greater than the first view angle, the method comprising:

obtaining an illuminance of external light other than the first light source unit and the second light source unit for the authentication target;

determining a power ratio of a second driving power supplied to the second light source unit to a first driving power supplied to the first light source unit to a preset first value when the illuminance of the external light is smaller than or equal to a predetermined illuminance threshold and supplying currents to the first light source unit and the second light source unit based on the preset first value of the power ratio; and controlling the power ratio to a second value smaller than the first value when it is determined that the authentication target is separated by a distance greater than a predetermined distance threshold based on characteristics of pixels of the face image obtained by an authentication apparatus after the irradiation of the light by the first light source unit and the second light source unit.

* * * * *